United States Patent
Savioz et al.

(10) Patent No.: US 12,290,201 B2
(45) Date of Patent: May 6, 2025

(54) SYSTEM FOR ASSISTING THE PERSONALIZED PREPARATION OF INFANT FORMULA INCLUDING A CONNECTED ELECTRONIC SCALE

(71) Applicant: SOCIETE DES PRODUITS NESTLE S.A., Vevey (CH)

(72) Inventors: Gregory Savioz, Saxonne (CH); Paul Michel, Lausanne (CH); Thibault Escalier, Montlebon (FR); Frederic Destaillats, Servion (CH)

(73) Assignee: Societe des Produits Nestle S.A., Vevey (CH)

( * ) Notice: Subject to any disclaimer, the term of this patent is extended or adjusted under 35 U.S.C. 154(b) by 949 days.

(21) Appl. No.: 16/967,066

(22) PCT Filed: Feb. 4, 2019

(86) PCT No.: PCT/EP2019/052570
§ 371 (c)(1),
(2) Date: Aug. 3, 2020

(87) PCT Pub. No.: WO2019/154742
PCT Pub. Date: Aug. 15, 2019

(65) Prior Publication Data
US 2021/0030196 A1 Feb. 4, 2021

(30) Foreign Application Priority Data
Feb. 8, 2018 (EP) ..................................... 18155655

(51) Int. Cl.
*G01G 19/414* (2006.01)
*A47J 31/40* (2006.01)
(Continued)

(52) U.S. Cl.
CPC ......... *A47J 31/5253* (2018.08); *A47J 31/401* (2013.01); *A47J 31/521* (2018.08);
(Continued)

(58) Field of Classification Search
CPC .... A47J 31/5253; A47J 31/521; A47J 31/401; A47J 2043/0733; G01G 19/414;
(Continued)

(56) References Cited

U.S. PATENT DOCUMENTS 6,538,215 B2 * 3/2003 Montagnino ...... G01G 19/4146
177/25.19
6,679,854 B2 * 1/2004 Honda ............... G01G 23/3728
600/587

(Continued)

FOREIGN PATENT DOCUMENTS

| CN | 104462780 A | 3/2015 |
|---|---|---|
| CN | 106503435 A | 3/2017 |

(Continued)

OTHER PUBLICATIONS

Computer translation of the "Description" section of EP 2980541A1 downloaded from the EPO website Aug. 10, 2023.*

(Continued)

*Primary Examiner* — Randy W Gibson
(74) *Attorney, Agent, or Firm* — K&L Gates LLP

(57) ABSTRACT

The invention relates to a computer program executable on a computer (4) for assisting the preparation of infant formula in an infant feeding container using an electronic scale (2) arranged in communication with the computer. The invention also relates to an electronic scale (2) for assisting the preparation of infant formula comprising a communication module (16) arranged to communicate with the computer (4) hosting the computer program.

20 Claims, 12 Drawing Sheets

(51) Int. Cl.
*A47J 31/52* (2006.01)
*G01G 23/37* (2006.01)
*G01K 3/00* (2006.01)
*A47J 43/07* (2006.01)

(52) U.S. Cl.
CPC ..... *G01G 19/4146* (2013.01); *G01G 23/3721* (2013.01); *G01G 23/3728* (2013.01); *G01K 3/005* (2013.01); *A47J 2043/0733* (2013.01)

(58) Field of Classification Search
CPC ........... G01G 19/4146; G01G 23/3721; G01G 23/3728; G01K 3/005
See application file for complete search history.

(56) References Cited

U.S. PATENT DOCUMENTS

| | | | |
|---|---|---|---|
| 10,352,759 B1 * | 7/2019 | Jensen | A47G 23/12 |
| 2006/0278093 A1 | 12/2006 | Biderman et al. | |
| 2010/0239030 A1 | 9/2010 | Fukahori et al. | |
| 2013/0029298 A1 | 1/2013 | Batsikouras | |
| 2013/0233627 A1 * | 9/2013 | Vidal | G01G 19/414 |
| | | | 177/45 |
| 2016/0138962 A1 | 5/2016 | Cartwright | |
| 2017/0050157 A1 * | 2/2017 | Konietzko | A61J 3/00 |
| 2017/0255760 A1 * | 9/2017 | Lee | G16H 20/10 |
| 2019/0231121 A1 * | 8/2019 | Alexander | A47J 36/2438 |
| 2021/0030196 A1 * | 2/2021 | Savioz | A47J 31/52 |

FOREIGN PATENT DOCUMENTS

| | | |
|---|---|---|
| DE | 102014105989 | 10/2015 |
| EP | 2980541 | 2/2016 |
| TW | 200521411 A | 7/2005 |
| WO | 2009100868 | 8/2009 |
| WO | 2016140623 A1 | 9/2016 |
| WO | 2017197113 A1 | 11/2017 |

OTHER PUBLICATIONS

Chinese Office Action for Appl No. 2019800082110 dated Oct. 9, 2021.

* cited by examiner

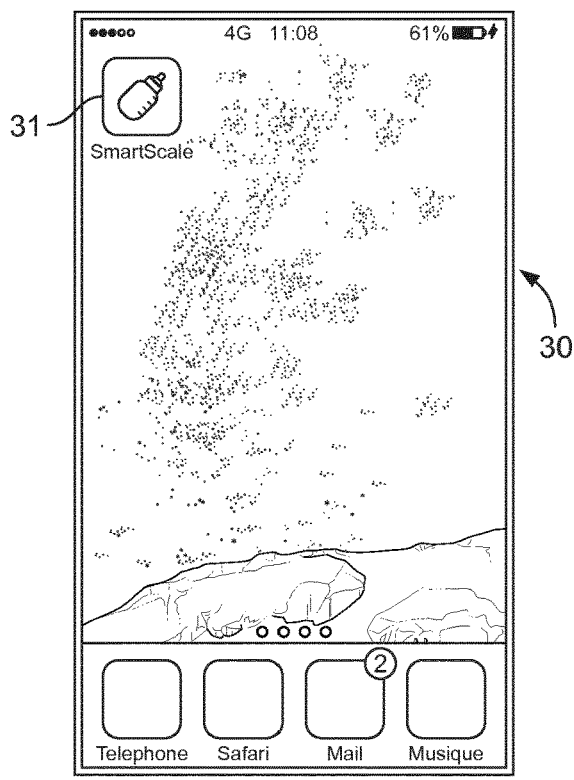
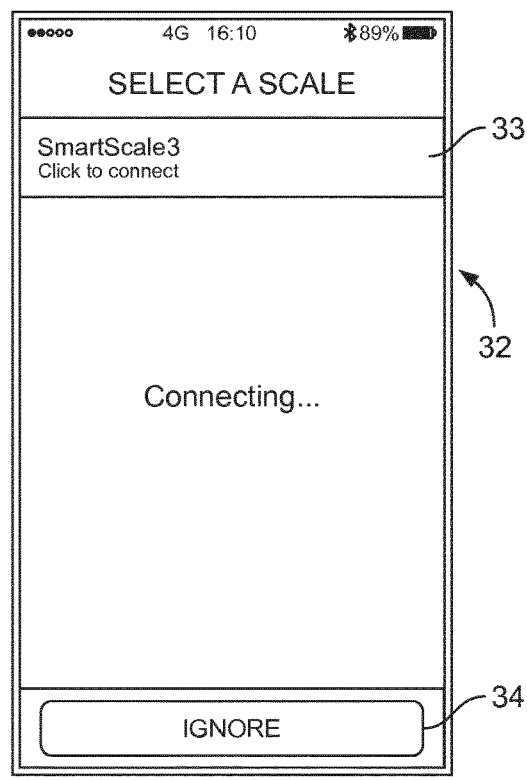
FIG. 11  FIG. 12
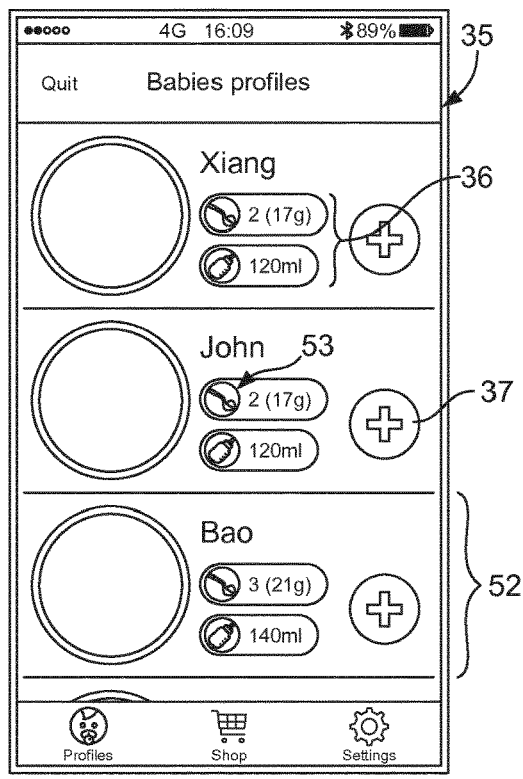
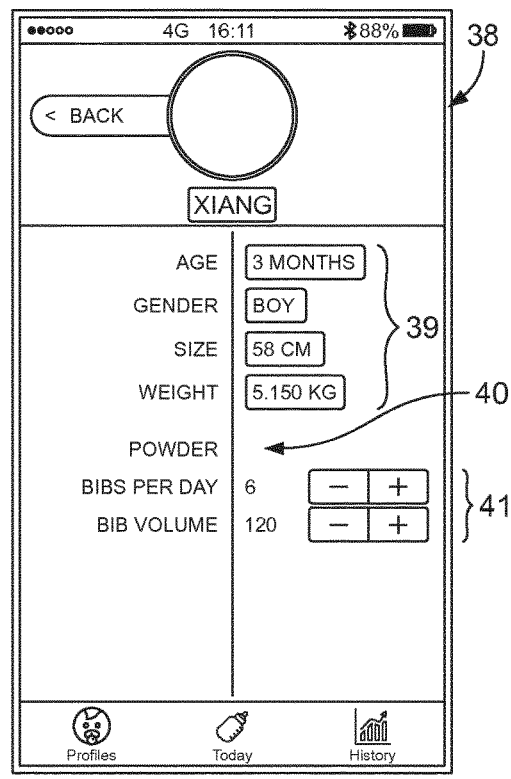
FIG. 13  FIG. 14

SYSTEM FOR ASSISTING THE PERSONALIZED PREPARATION OF INFANT FORMULA INCLUDING A CONNECTED ELECTRONIC SCALE

CROSS REFERENCE TO RELATED APPLICATIONS

The present application is a National Stage of International Application No. PCT/EP2019/052570, filed on Feb. 4, 2019, which claims priority to European Patent Application No. 18155655.6, filed on Feb. 8, 2018, the entire contents of which are being incorporated herein by reference.

FIELD OF THE INVENTION

The invention relates to the field of the preparation of infant formula in infant formula containers, e.g. baby bottle, using an electronic scale for assisting the preparation and for providing convenience and safety to the user.

BACKGROUND

The infant formula is usually manually prepared by measuring a quantity of warm water usually with a graduated vessel, pouring the measured water quantity in an infant formula container such as a baby bottle and adding a dosed quantity of infant formula product such as infant formula powder with a spoon or another volume dosing device and mixing (shaking, stirring, etc.) to obtain the ready-to-drink infant formula.

There are several drawbacks associated with this common method.

First of all, the choice of the infant formula product is critical and must be made to properly match with the growth's profile of the infant and/or its specific nutritional needs or diets. If the choice of the type of infant formula product is inappropriate, it may have negative consequences on the growth or health of the infant and may lead to nutritional deficiencies or weight issues.

Secondly, the preparation of the infant formula itself requires a lot of care by the person handling it to ensure again that the recommendations usually provided on the package of the infant product are well followed. Again, a lack of compliance with the product recommendations may be prejudicial to the growth of the infant or may affect the health of the infant on the short or long term.

Thirdly, despite all possible care given to the manual preparation, the nutritional intake by the infant may be inconstant and be influenced by many physiological or psychological factors such as the appetite disturbance, the hydration level, the mood or health of the baby, etc. As a result, the history of the infant feeding is not well known and the appropriate feeding corrections are not easy to implement by the parents or caregivers.

US 2006/0278093 relates to a feeding formula appliance for preparing a fluid food at a desired consumption temperature on demand including a dispenser of water and powder, comprising a data processor, memories and a user interface for inputting information necessary for preparing the infant formula. The appliance comprises a processor and a quantity detector to control dosing of the product, control the filling level and the consumption temperature and the food consumption. However, the appliance provides general control to run an automated dispensing systems but no coaching adapted to aid a manual infant formula preparation while taking into account the recommendations for the infant formula products and the individual feeding requirements specific for each infant. It also does not remove the choice for the proper product and does not provide the relevant feedback information to the caregiver.

Philips uGrow™ baby development tracker relates to a smartphone application which provides information as to the baby feeding and sleeping patterns and tracks his/her height and weight. The application can connect to various connected devices such as a smart bottle sleeve, a baby monitoring device, an ear thermometer, a white light ambiance system or an air purifier.

Blue Smart Mia™ connected system relates to a smartphone application providing baby's feeding tracking service using a smart sleeve for baby bottle capable of registering feeding amount by voice recognition and registering feeding time (https://bluesmartmia.com/).

The present invention alleviates the problems of the prior art methods and systems.

SUMMARY OF THE INVENTION

A first object of the invention relates to a computer program executable on a computer for assisting the preparation of infant formula in an infant feeding container using an electronic scale arranged in communication with the computer.

More particularly, the computer program is configured to:
store at least one personal infant profile comprising information related to an identified infant,
pair an infant formula product selected from a plurality of infant formula products with the stored infant profile,
compute from the pairing of the formula product and stored baby profile, a coaching instruction set by determining preparation information enabling control of operations of the electronic scale in the preparation of an individual infant formula and intended to be communicated to or generated by the scale for enabling the scale to control such operations.

The infant profile may comprise growth related information which are personal to an identified infant (e.g. Xiang, John or Bao) and are deemed relevant, at least in part, to the feeding of the baby. Preferably, the infant profile comprises primary information related to the age of the baby, e.g. her/his birth date. Additionally, the baby profile may comprise secondary information including any one or a combination of the following data: gender, weight, size, country, allergy, diet and which are personal to the identified infant.

The pairing of the infant formula product with the stored infant profile can be obtained by the program making a relation between at least the primary information and a type of infant formula product (e.g. Infant product #1, #2 . . . ) which is adapted or suitable to the selected information. The relation can be based on a look-up table stored in a memory of the computer and/or retrieved from a remote server. For instance, the look-up table provides a correspondence between the age of the infant and the type of infant formula product. The program may optionally select secondary information such as the weight and/or size of the infant to complete or fine tune the pairing with the infant formula product.

In the next operation, the computer program computes a coaching instruction set which generally includes the necessary information to control the operations of the electronic scale in the preparation of an individual infant formula. The computing can be implemented by calculation and/or selection of the instructions from a look-up table.

Preferably, the program is configured to determine in the coaching instruction set the quantity set points of the components entering into the composition of the infant formula. In particular, the coaching instruction set comprises at least a water quantity set point and an infant formula quantity set point for enabling the scale to control the weighing of such quantities. The water quantity set point can be an absolute weight value (e.g. a quantity in gram). The infant formula quantity set point can be: an absolute infant formula weight value or (e.g. a full quantity of infant formula in gram) or a relative volume value or weight value (e.g. a number of infant powder spoons representing a defined quantity unit). The quantity set points can be determined by taking into account information of the infant profile, in particular the weight of the infant. In the computing operation, the coaching instruction set may define the weighing mode or provide a choice amongst different weighing modes (i.e. the absolute and/or relative weight values).

The computer program may be further configured to provide data entry means accessible to the user for acquiring information on the infant profile. The data entry means can take the form of an information request page or other interface control accessible by the user on the computer's user interface and which can be completed by the user (e.g. parents, caregiver, pediatrician . . . ). The advantage is that the update of the infant profile is made possible in an easy manner.

For enabling the selection of the infant formula product, the computer program may be configured to provide at least one control interface adapted to retrieve product identification data associated to the infant formula product for identification or authentication of the infant formula product to enable the pairing with the baby profile. The retrieval of product identification data can be obtained by scanning a code associated with the infant product. The code may be an optical code usually a barcode such as a 1D, 2D bar code like QR barcode usually applied on the package of the infant formula product. The product identification data may contain information such as: the product type, a unique identification numeric or alphanumeric number, an expiry date, a brand or name and combinations thereof. The information can be contained in the code.

The program may be configured to compute and display on the computer's graphical interface information received by the scale. In particular, the information may be preparation information as the individual and/or cumulated weighed quantities of infant formula per given time period(s) (e.g. per day, week, month . . . ). The quantities may be displayed in the form of a feeding history such as by graphics (curves, bars, spiders, etc.), tables and the like. The information may also be consumption information related to the weighed quantities of remaining (non-consumed) infant formula per time period (e.g. per day). The consumption information may be compared to the preparation information and displayed in a comparative manner. The coaching instruction set can be corrected as function of this comparison for controlling the operations of the scale for the next preparation(s) accordingly.

The computer program is preferably configured to communicate by wireless communication such as BLUETOOTH® to the electronic scale. It is preferably configured to be hosted by an in-home computer, a tablet or a smart phone. As a result, the electronic scale can be kept small, simple and non-expensive since the computer program is embedded in a computer device with is distinct, is generally designed with higher processing capabilities and memory and can communicate with the scale wirelessly and in bi-directional mode.

The invention further relates to an electronic scale for assisting the preparation of infant formula in an infant feeding container wherein the scale comprises a weighing unit with a user interface, a control unit and a communication module arranged to communicate with a computer hosting the computer program as aforementioned and wherein the scale is arranged for selecting an infant profile and controlling operations of the infant formula preparation according to a coaching instruction set received from the computer device resulting from the pairing of the selected infant profile and an infant formula product selected from a plurality of infant formula products.

For coaching the user in the preparation effectively, the electronic scale is preferably arranged for weighing and controlling the water quantity and infant formula quantity to match respectively a water set point and an infant formula set point during preparation and preferably for recording the weighed infant formula quantity.

For consumption monitoring purpose, the scale may also be arranged for weighing the quantity of remaining (non-consumed) infant formula and for communicating it to the computer. Preferably, it is also arranged for comparing such quantity to a recommended infant formula quantity and/or to the weighed infant formula quantity recorded as resulting from the preparation.

The electronic scale can be arranged for displaying on its user interface information related to the ongoing preparation and/or to next preparation(s).

The scale can also be arranged for displaying on the user interface the water weighing and the infant formula weighing in real time such as under the form of progression bars, percentages, or function curve and preferably for providing a visual and/or sound signal when the weighed water quantity and infant formula quantity have matched the respective set points. Therefore, the preparation by the user of the infant formula is facilitated and the risk of dosing errors are minimized.

Furthermore, the scale may comprise a temperature sensing unit for sensing the liquid temperature in the container. The temperature sensing unit may be connected to the weighing unit for communicating the temperature of the water and/or infant formula. The scale unit may further display information as to the temperature of liquid sensed. Optionally, the scale unit is configured for interrupting the coaching program or requesting correction if the sensed temperature deviates from a temperature set point.

The term "program" or "computer program" should not be interpreted narrowly and may include the combination of multiple computer programs interoperating and/or designed for particular functions.

In a further aspect, the invention relates to a non-transient computer readable medium comprising the computer program as described in the present application. The non-transient computer readable medium may comprise a memory unit associated with a processor of the computer.

BRIEF DESCRIPTION OF THE DRAWINGS

FIGS. 11 to 18 relate to screenshots of a preferred embodiment of a control interface of the computer program displayed on the computer according to the invention;

DETAILED DESCRIPTION OF THE DRAWINGS

Figure 1:
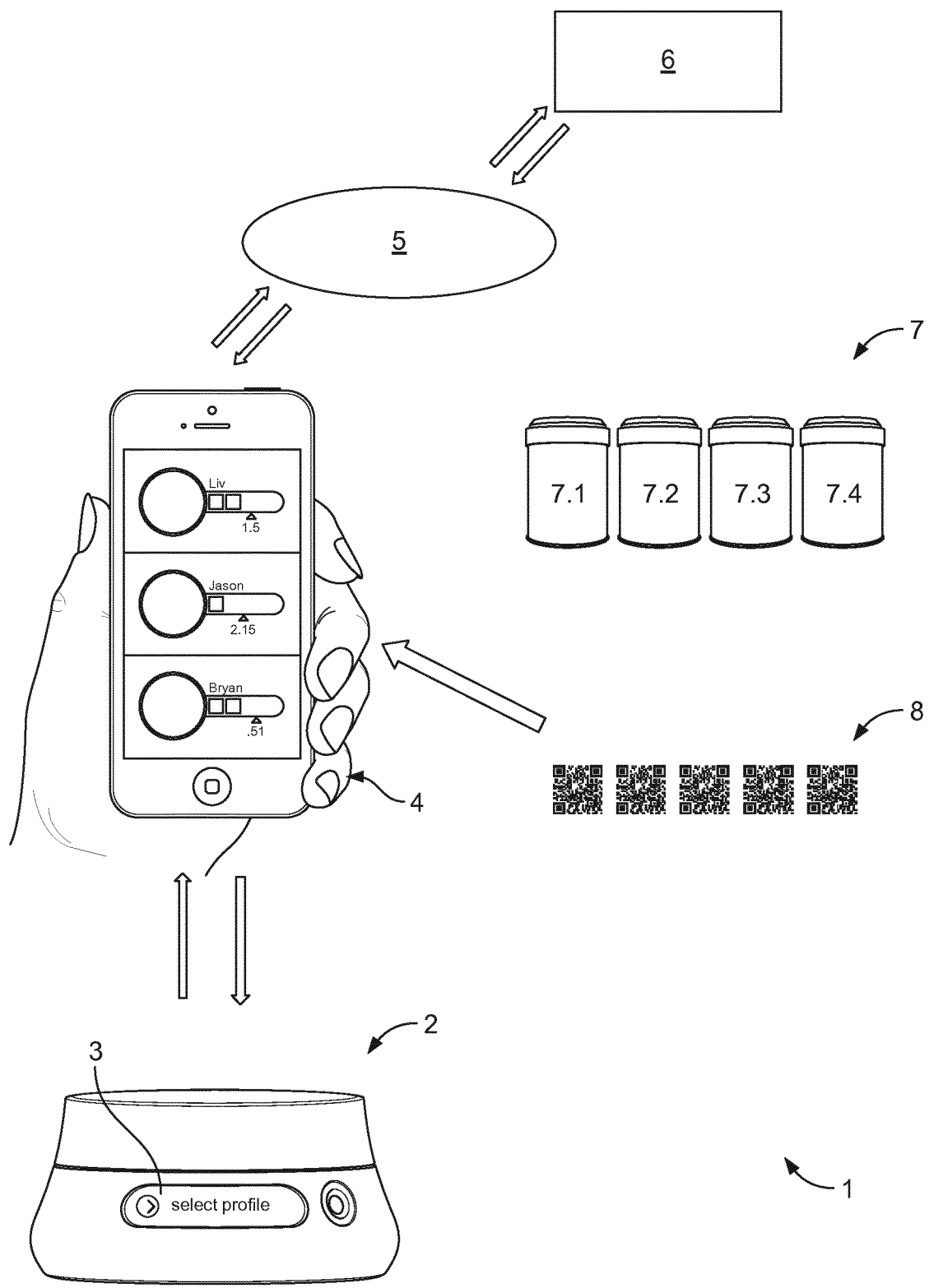
FIG. 1 illustrates a computer assisted system for assisting the preparation of infant formula according to the invention.

The computer assisted system 1 of the invention is illustrated in FIG. 1. It generally comprises a dedicated electronic scale 2 comprising a user interface 3 and an executable program hosted in a computer 4.

The computer is connected to a communication network 5, generally linked to a remote resource such as a server 6. The computer comprises, as known per se, a user interface, a processor and memories, means for inputting data and a communication module. In particular, the computer may be a smart phone, a tablet or an in-home computer accessible to the user in charge of preparing the infant formula.

The system further comprises a plurality of infant formula products 7. The products may be for example a range of packaged infant formula compositions corresponding to different stages of the growth of the infant or be related to particular nutritional or therapeutic diets. The infant formula products may be stored in product packages such as cans, pouches, cartridges and the like. Each kind of infant formula product may be associated to product identification data. The product identification data may comprise: a product type (7.1, 7.2, 7.3, 7.4 . . . ), a unique identification numeric or alphanumeric number (e.g. serial number), an expiry date, a brand or name, product plant and combinations thereof. The product identification data can usually be used for determining the type of product the product belongs to and for safety, logistic and traceability purposes.

The product identification data is preferably coded in an optical code 8 such as a 1D or 2D barcode such a QR code and the like. This information of the code can be retrieved by the computer such as by scanning with a camera and image processing means that can be part of the computer itself or be connected thereto. The product identification data can be stored in the memory of the computer and be used for preparing the beverage by carrying out initial functions such as the identification and pairing of the infant formula product to a baby profile. A particular program of the invention (application or "App") is configured to execute instructions in the computer to carry out these functions.

The electronic scale 2 is preferably connected to the computer wirelessly such as by BLUETOOTH® or equivalent. The communication between the application ("App") of the computer and the scale can be carried out automatically such as by light pairing. The communication is configured to be bi-directional thereby enabling data to be communicated from the computer to the scale such as preparation instructions and data to be communicated from the scale to the computer such as feedback information like weight-related, time-related and/or temperature information.

Figure 19:
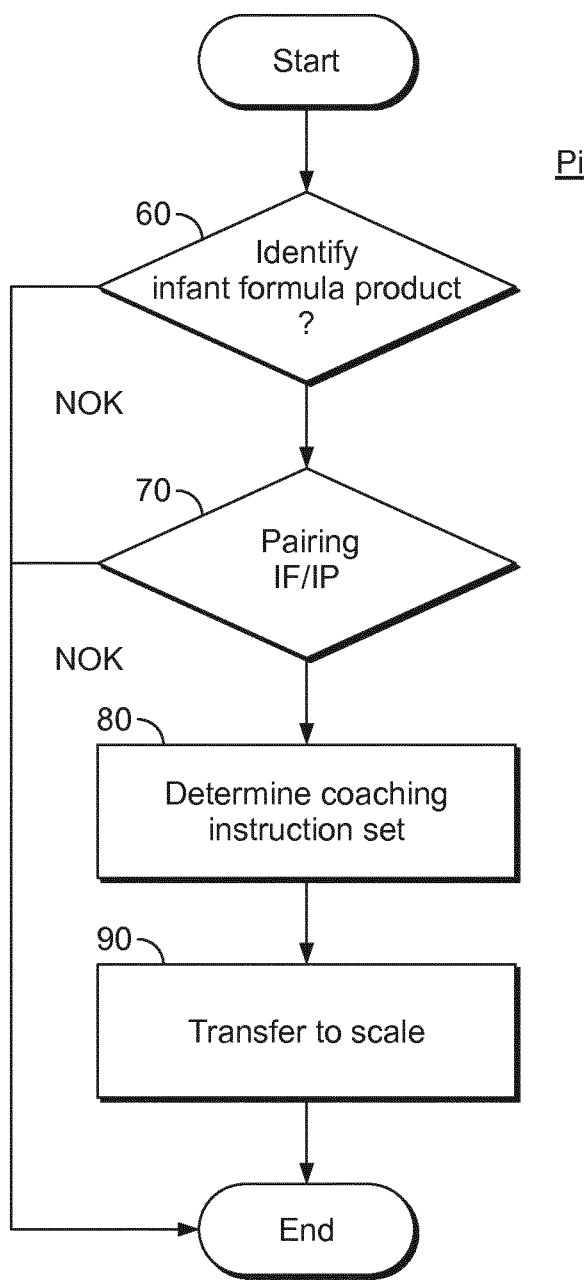
FIG. 19 relates to an example of a simplified flow chart for a program (Pi) executable of the invention on a computer.

In particular shown in FIG. 19, a program Pi hosted in the computer may be configured for sending a coaching instruction set to the scale. In a first operation 60, the program is configured for acquiring information from the infant formula product such as by scanning a code. An optional check on the authorization of the infant formula product may be carried out by the program to ensure the safety compliance of the product. The program may be ended if the infant formula product is identified as undesirable. Data may also be transmitted (i.e. downloaded) from the server to the computer after product identification is completed. For instance, data may relate to product information updates such as nutritional facts, recommendations or messages for the user.

In a second operation, the program is configured for selecting the infant formula product as function of relevant information in the infant profile such as his/her age and pair them (i.e. Infant Formula/Infant Profile pairing operation 70). Other kinds of information may be taken into account that can be personalized to the infant to be fed such as a particular allergy or therapeutic reason or diet. In this operation 70, if pairing is unsuccessful, e.g. because the scanned infant formula product is not adapted to the infant profile, the program may be ended and/or a corresponding message displayed. If pairing is successful, the program may record the identified infant formula product in the infant profile.

As a result of such pairing, the program is allowed to determine in function of the selected or recorded infant formula product, the coaching instruction set in particular the weighing set points to control the preparation of the infant formula with the scale (Coaching instruction set operation 80). The set points forms a coaching instruction set which is addressed by the computer to the scale. These set points are specific to each infant formula product. The set points can be: the weight of water and the weight of infant formula. They are usually determined as function of information in the infant profile which is relevant to the preparation of the infant formula, e.g. weight and/or size of the infant. Therefore, the computer generally stores such information enabling such determination by the program. In the simplest possible form, such information can be for each infant formula product, the correspondence between the relevant infant formula information, e.g. his/her weight, and the relevant weight set points for the scale. Finally, the set of coaching instructions containing such set points are transferred from the computer to the scale for execution of a corresponding program by the scale (Transfer to scale operation 90).

In a possible variant, the determination of the set points could be executed by a program of the scale from information related to the infant product and to infant profile transferred by the computer to the scale. However, this variant is less preferred as it requires a more complex control unit with more processing power and a larger memory in the scale.

The communication between the computer and the remote resource 6 via the communication network is also preferably established bi-directionally to allow exchange of information. In particular, the communication from the server to the computer can be carried out for updating the program of the invention in the computer, for sending product identification data or notifications such as nutritional recommendations, safety messages or promotional offers. The communication from the computer to the server can also be carried out for tracking information, sending program status, creating and updating customer or nutritional data bases, for accessing to websites, shopping, etc.

Figure 2:
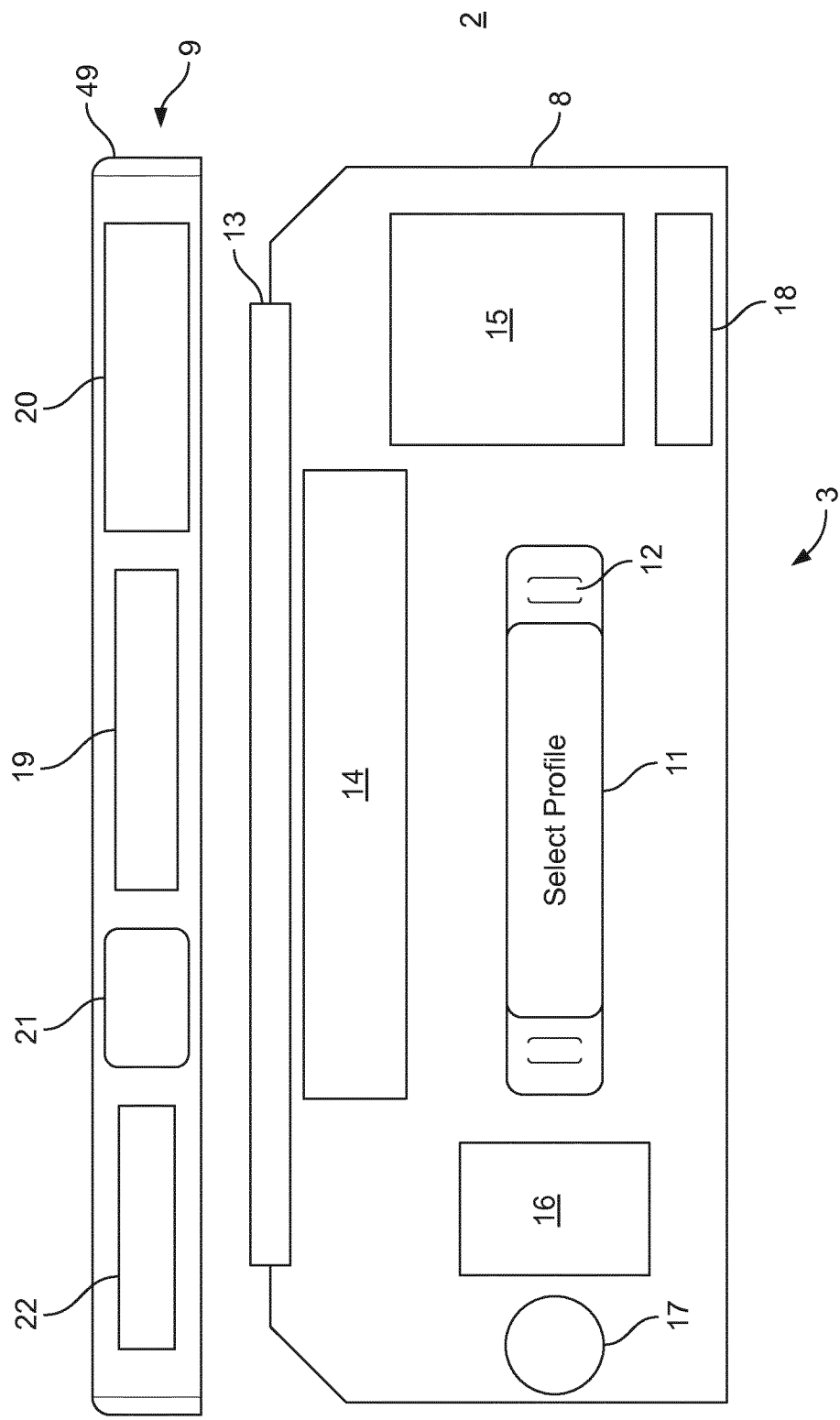
FIG. 2 is a schematic functional view of the electronic scale of the system of the invention including an optional temperature sensing apparatus in communication therewith.

FIG. 2 illustrates an example of the connected electronic scale 2 of the invention. The scale comprises a weighing unit 8 and an optional temperature sensing unit 9. The weighing unit 8 is configured to provide preparation instructions, infant profile information or other types of information to the user via the user interface 3 comprising a low-consumption screen 11 (e.g. E-ink paper) and a user selection buttons 12 such as to select and validate choices and/or navigate through different menus displayed on the screen. The scale is able to measure the water quantity filled in the infant container as well as the infant product quantity filled in the container when added to the water. The scale comprises a weighing support 13 and at least one weight sensor 14 that provides weight-related input to a control unit 15 (e.g. a main PCB). A communication module 16 such as a bi-directional wireless module (e.g.BLUETOOTH®) may also be connected to the control unit for the exchange of data (coaching instructions, consumption data, program updates, etc.) with the computer. A connectivity button 17, e.g. an on/off button with light e.g. LED, connectivity feedback may be further provided. An electrical supply location 18 for a rechargeable energy accumulator or an exchangeable battery, is provided to supply the different electronic components with low voltage current.

The temperature sensing unit 9 can be connected to the weighing unit to be able to communicate information as to the sensed temperature of the liquid in the infant container (e.g. baby bottle). The temperature sensing unit 9 may comprise a contactless sensor 19 such as an infrared temperature sensor for sensing the temperature of the liquid in the infant container without contact so reducing the risk of contamination. The unit 9 preferably forms a lid that may cover and protect the weighing support of the weighing unit. The temperature sensing unit comprises a control unit 20 (e.g. PCB) to receive temperature input. The connection may be obtained by a wireless communication module 21 connected to the control unit 20 for communicating temperature information to the scale and/or to the computer. An electrical supply location 22 for a rechargeable energy accumulator or an exchangeable battery 22 is provided to autonomously supply the temperature sensor and control unit with low voltage current. The sensor could also be a contact sensor such a thermocouple probe.

The main procedure of infant formula coaching carried out under the control of the electronic scale can be described in relation to FIGS. 3 and 5-9 and 20.

Figure 3:
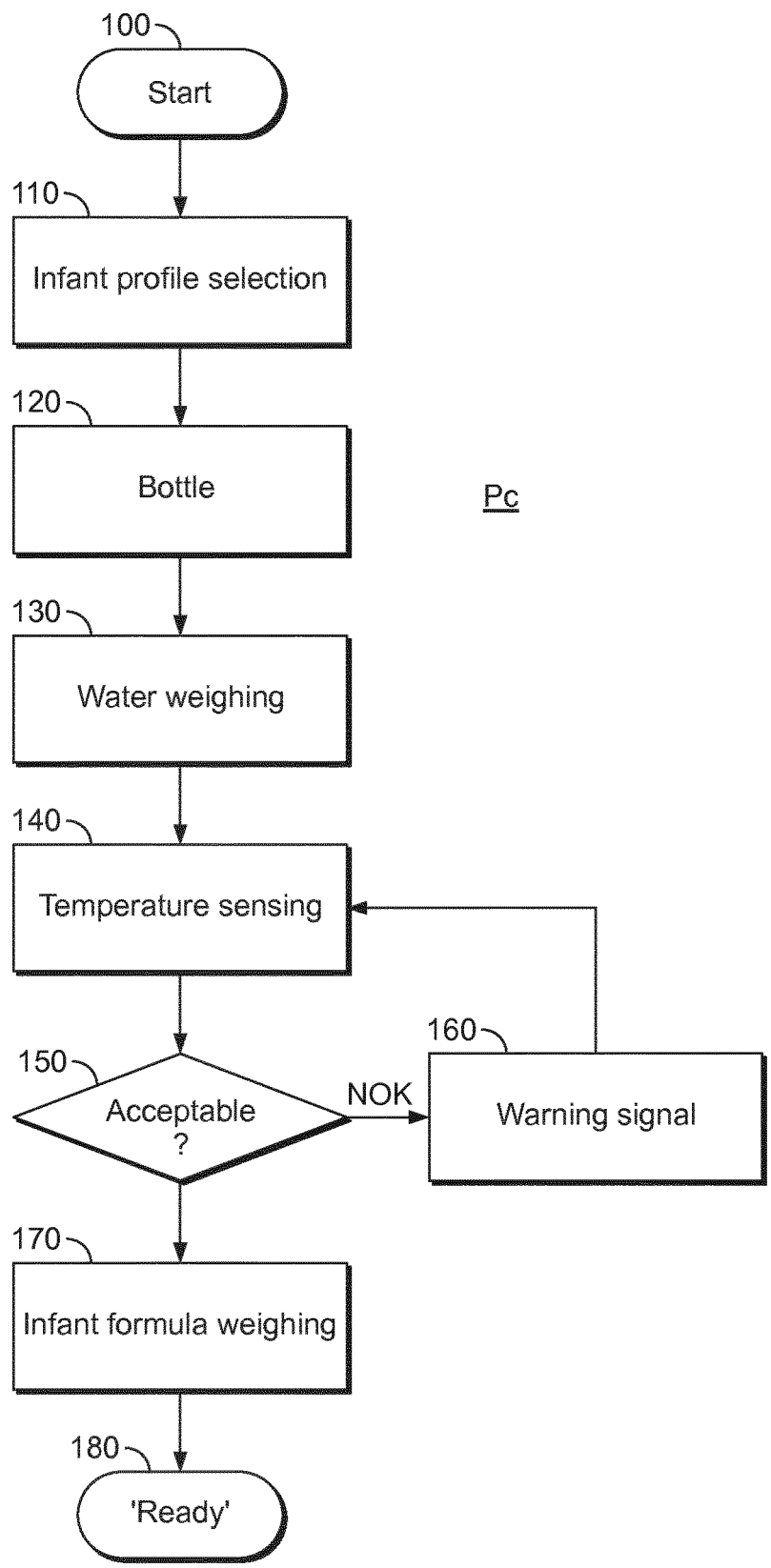
FIG. 3 relates to a flow chart for a coaching program (Pc) for controlling the preparation of the infant formula on the electronic scale.
Figure 20:
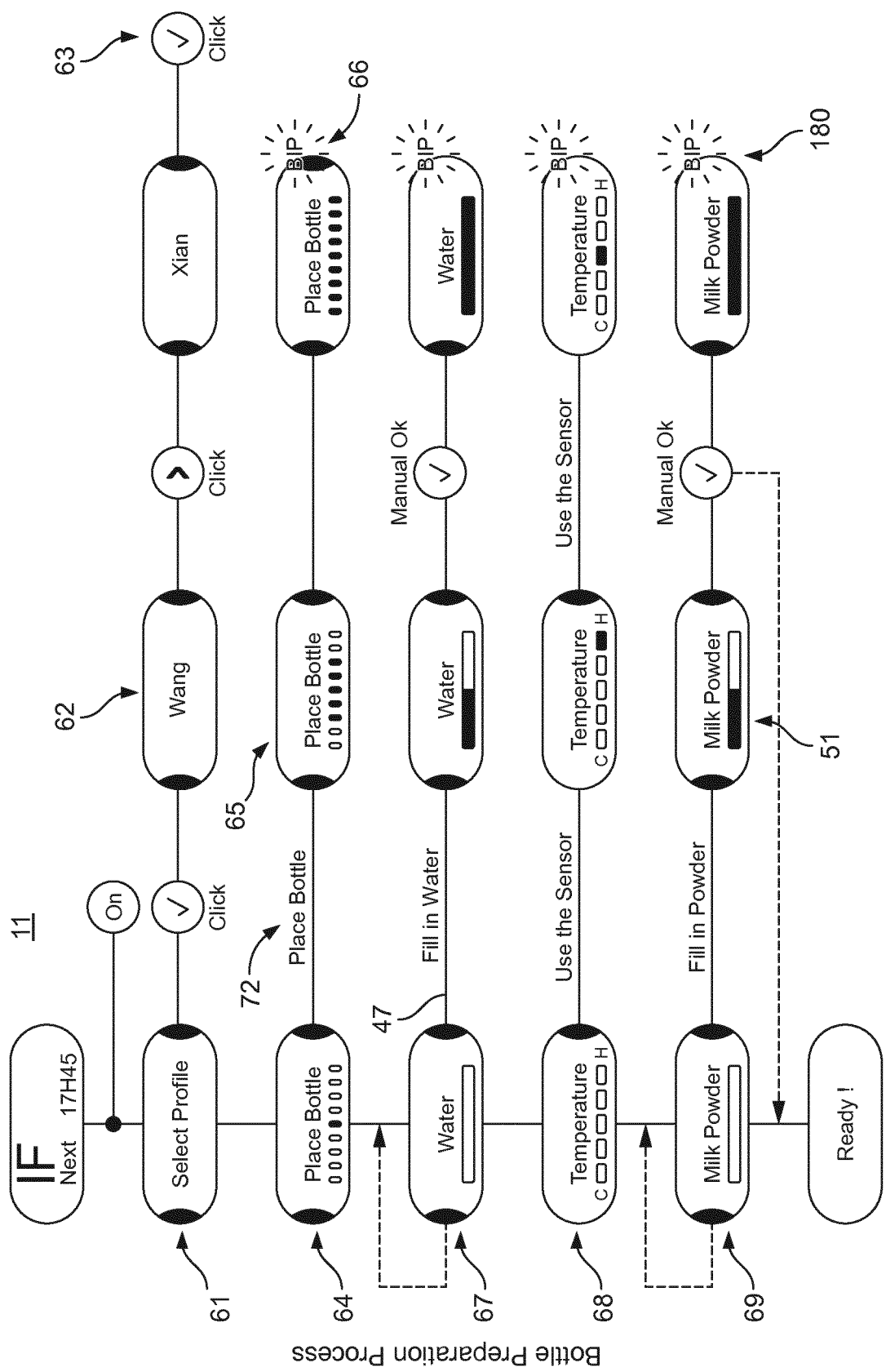
FIG. 20 shows an example of the possible work flow of the coaching program (Pc) displayed on the user interface of the electronic scale.

FIG. 3 illustrates the coaching program Pc comprising the steps carried out by the scale under control of its control unit 15 and user interface 3 during preparation of the beverage. After the scale has started in step 100, the scale proposes the selection of an infant profile amongst a list of infant profiles in step 110. The request for selection 61 may appear on the screen 11 of the user interface (FIG. 20). The displayed infant profiles 62 are preferably stored in a memory of the control unit of the scale so that preparation is enabled even when the communication between the computer and scale is interrupted. The list of profiles can be regularly updated from the computer to the scale. It is also possible to retrieve a new profile by requesting information to the computer in this operation. The validation 63 of an existing infant profile triggers the next operation of the procedure of the program.

The infant profile is usually stored in the computer to enable each profile to be paired with a particular infant formula product. The pairing is preferably carried out in the program executable by the computer but could also be carried out as instructions carried out by a program embedded in the control unit of the scale. As a result of the pairing, coaching instructions (also called "a coaching instruction set") are generated. Again the coaching instructions are preferably generated by the application stored in the computer but, less preferably, could also be generated by a program in the scale. If the coaching instructions sets are determined by the computer, each set is attributed to a particular infant profile. Once the choice for the infant profile is performed by the user on the user interface of the scale, the coaching instruction set is associated by the scale to such profile thereby enabling the scale to operate the preparation according to the set matching the selected infant profile.

The coaching instruction set would typically comprise a water quantity set point and an infant formula quantity set point for enabling the scale to control the weighing of such quantities.

The coaching instruction set may further comprise instruction data amongst: a time related to the frequency or period of preparation of the infant formula, a number of preparations per day, infant product information and combinations thereof. For example, the control unit of the scale may receive information as the acceptable time range for the preparation and may operate a check to verify if the preparation operation is too early or too late or on time and can inform the user by a message, adjust the instructions (e.g. set points) or eventually disable the preparation procedure.

In the next operation 120 of the scale's coaching program Pc, the empty infant container (e.g. baby bottle) weight is measured (i.e. tared). This operation can be optional but it ensures weighing accuracy when different infant containers are utilized. The instruction to place the empty infant container on the scale and the indication that the taring operation is running may be displayed on the screen such as by message 64 (FIG. 20). A signal, e.g. a sound alert 66, can be generated when the operation is completed as illustrated on FIGS. 5 and 20.

Figure 6:
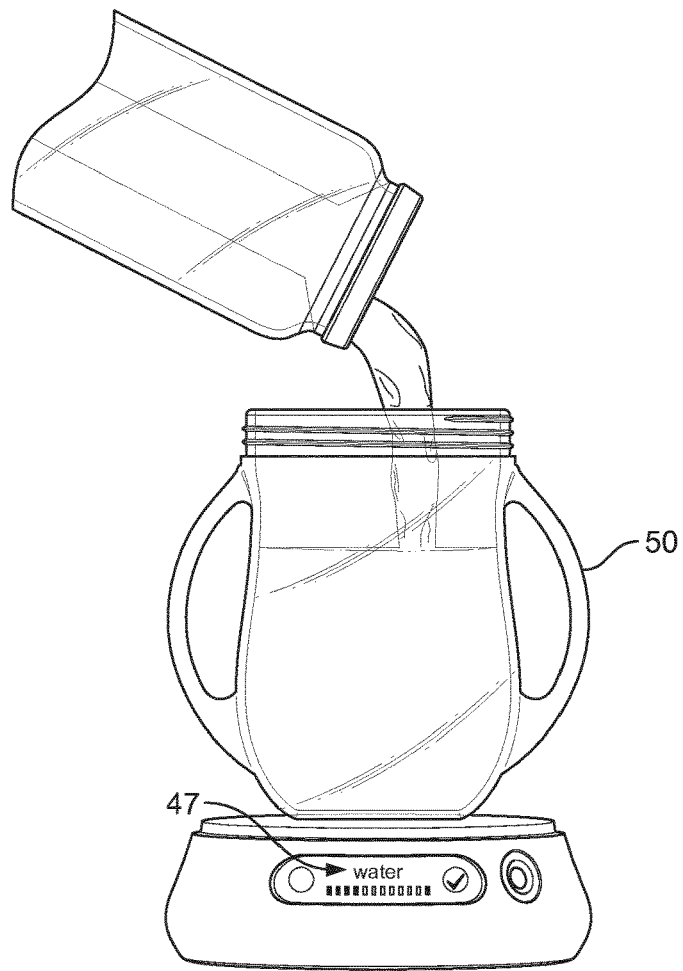

In the next step 130, water filled in the infant container 50 by the user (or eventually by a dosing device) is weighed by the scale. A request 67 for filling water in the infant container can be displayed on the interface and a visual indication on the progress of the water weighing operation is preferably displayed on the screen as shown in FIG. 6 such as under the form a progression bar 47 until the water weight set point is reached.

Figure 7:
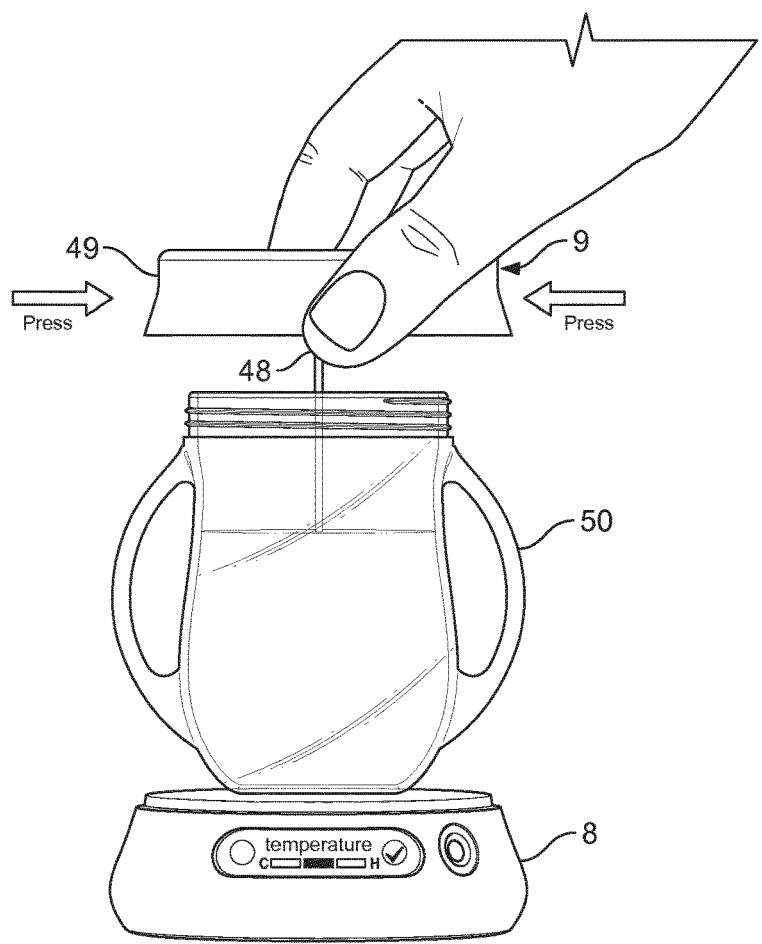
Figure 8:
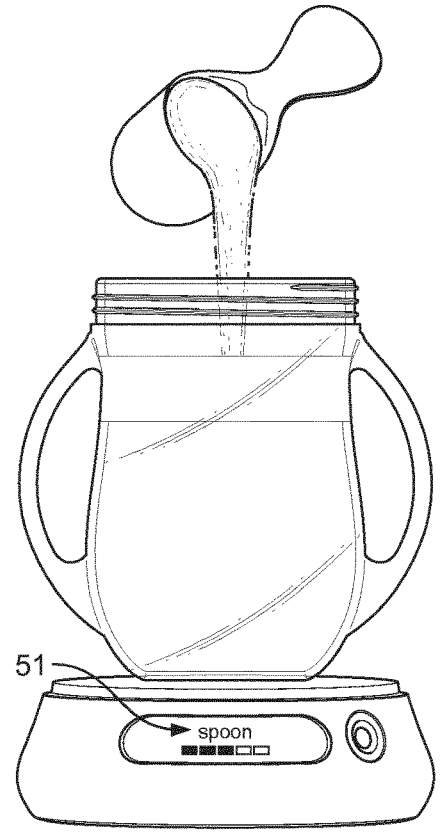
Figure 9:
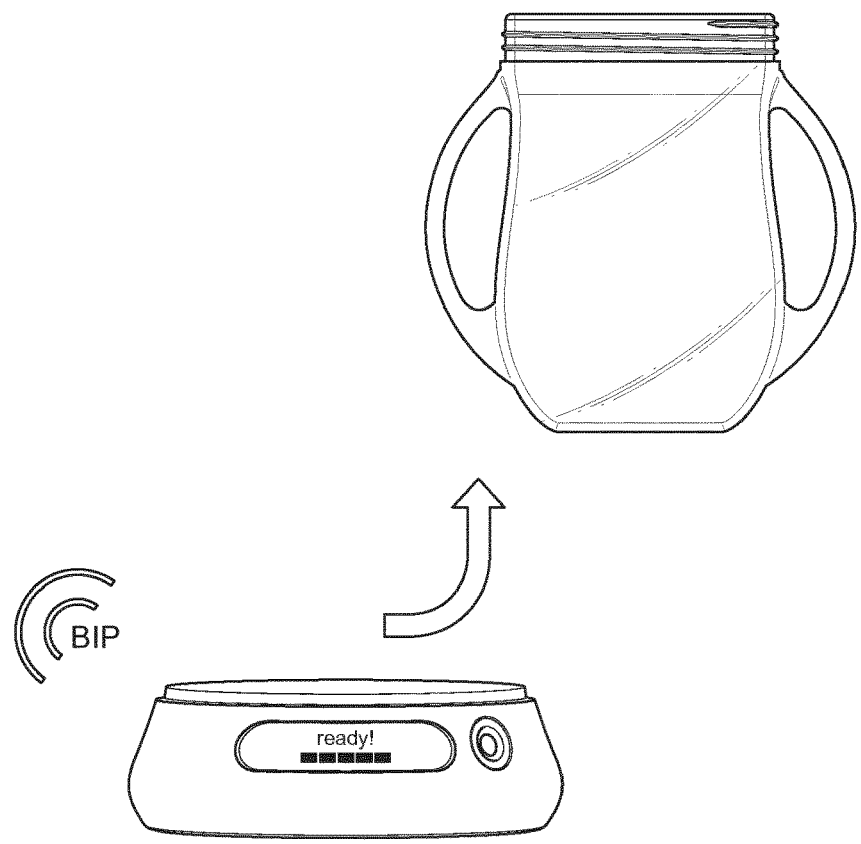

A next temperature sensing operation 140 that may be optional or compulsory, may start at the condition the preceding step is successfully completed. In this operation, the temperature sensing unit 9 measures the water temperature by placing the infrared sensor above the water surface (thereby generating infrared beam 48) as shown in FIG. 7. The infrared sensor may be electronically activated by means of a switch. A preferred arrangement of the switch can be a deformable annular ring shaped switch 49 which presents the advantage to be pressed or squeezed by hand on the side of the unit. The unit with the infrared sensor is configured to measure the temperature of water surface at a distance of a few centimeters. The temperature result may be displayed on the user interface of the scale and/or on a user interface of the sensing unit 9. The temperature display 68 may a temperature point in scale or the like. The display may be followed by a validation step in which the user is requested to continue the preparation or it may automatically trigger the next operation. A check 150 of the correct temperature can be performed and a warning signal 160 be generated if the sensed temperature does not match the temperature set point. If the sensed temperature is acceptable (e.g. corresponds to a temperature set point memorized in the scale), the next operation 170 of the standard preparation procedure can take place.

In the next operation 170, a request 69 is displayed by the scale to fill infant formula ingredient in the container (FIGS. 3 and 20). The weighing of the infant formula (i.e. the cumulative weight of water and powder) is carried out by the scale in a same manner as for water. The weighing in step 170 is preferably carried out in a continuous manner and preferably displayed on the screen such as under the form of a progression bar 51. When the measured weight reaches the infant formula set point, the operation is ended automatically or upon a user's prompt and a visual and/or sound signal 180 is generated. The conditions and/or time at which the preparation has been completed can be confirmed by the scale to the computer and recorded in the computer and/or scale to be used for historical feed tracking of the preparation.

The coaching procedure in the scale may also be configured to be modified manually by the user at the different steps of the preparation (e.g. increase or decrease of the water and/or infant formula set points). In such case, these modifications may also be transferred to the computer and recorded to ensure information tracking.

Figure 4:
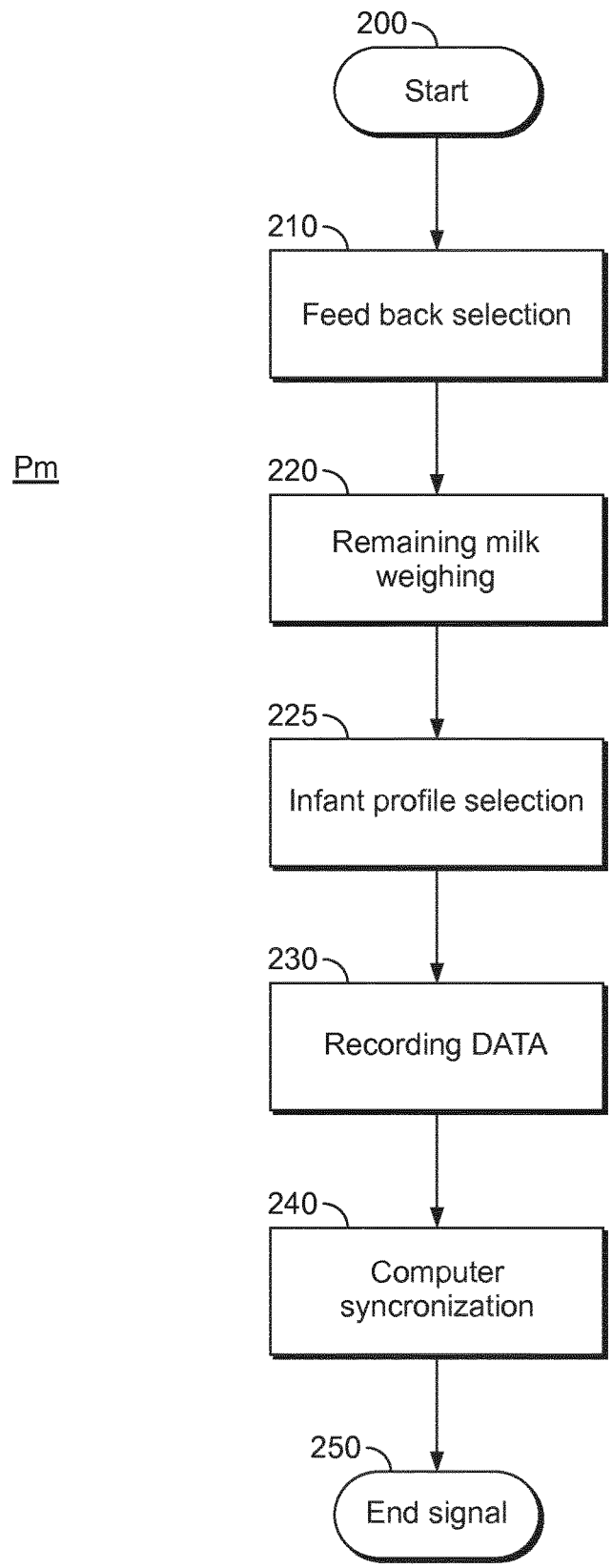
FIG. 4 relates to a flow chart for a consumption monitoring program (Pm) for controlling the infant formula consumption of the prepared infant formula using the electronic scale.
Figure 5:
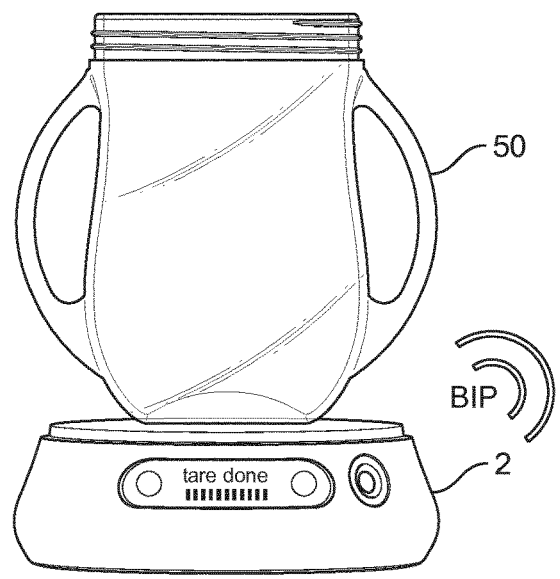
FIGS. 5 to 9 illustrate to the different operations for preparing an infant formula with the preparation system of the invention.
Figure 10:
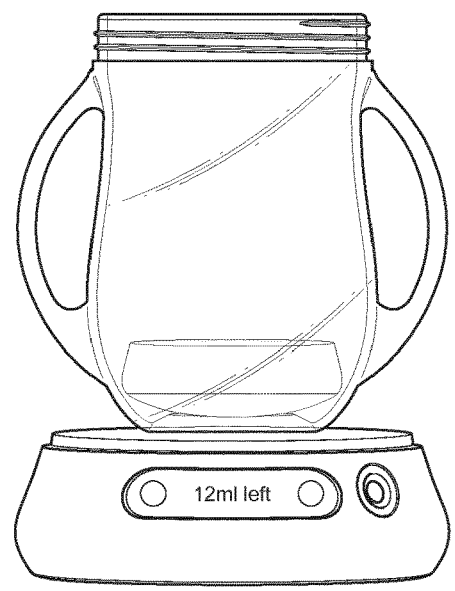
FIG. 10 illustrates the procedure for controlling the consumption of the infant formula using the scale.
Figure 21:
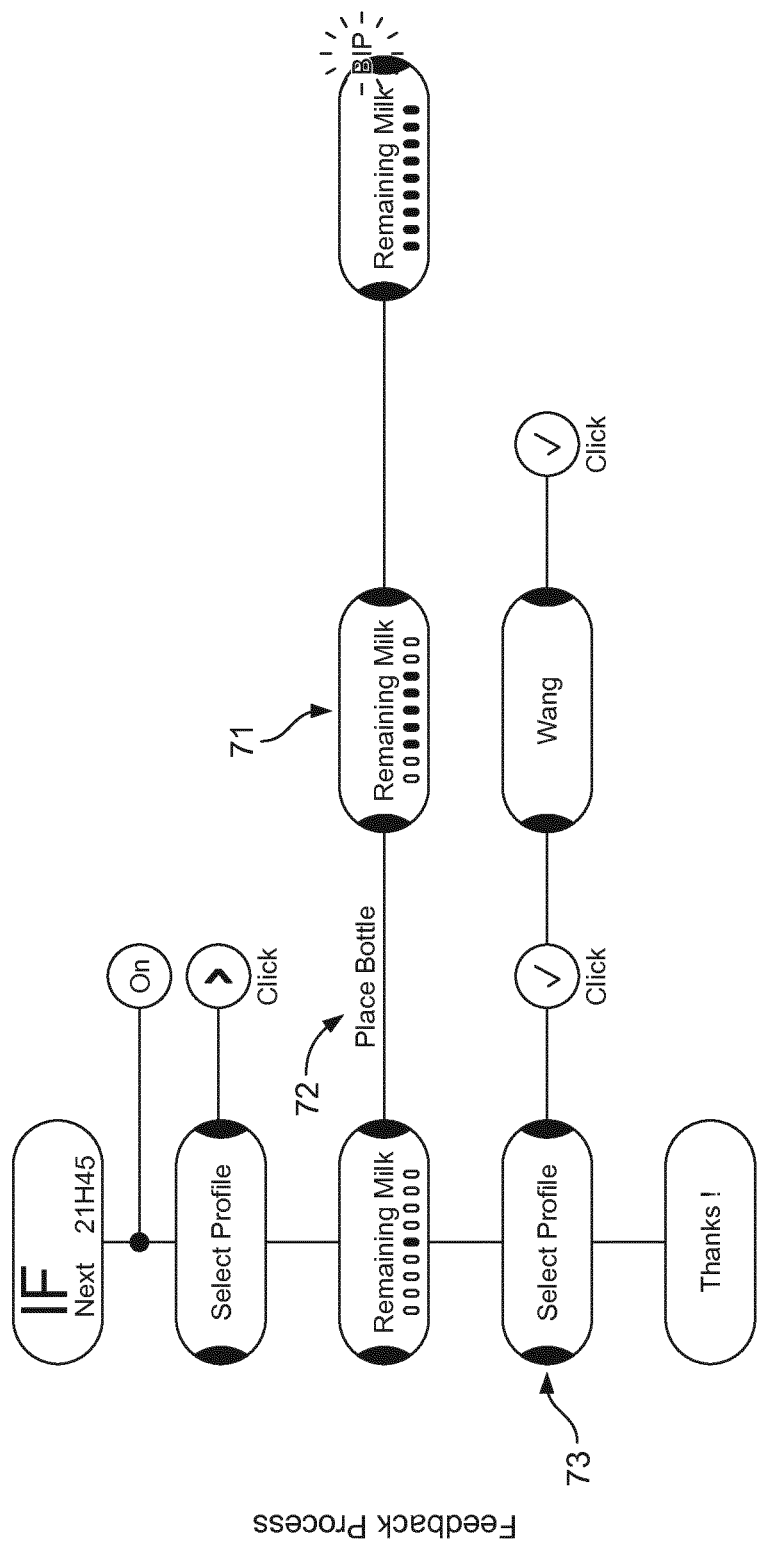
FIG. 21 show an example of the possible work flow of the consumption monitoring program (Pm) displayed on the user interface of the electronic scale.

A consumption monitoring program Pm carried out under the control of the electronic scale can be described in relation to FIGS. 4, 10 and 21. The procedure enables to determine the remaining (i.e. non-consumed) infant formula amount, to record it and to transfer this information to the computer. After the scale is in start mode 200, the consumption control procedure can be selected in step 210. A request 72 for placing the infant formula container may be displayed by the user interface of the scale (e.g. "Remaining milk"). In the next operation 220, the scale is configured to measure the remaining infant formula weight when the infant container is positioned on the scale. An indication 71 of the remaining quantity (e.g. such as a volume on a graduated scale) of infant formula may be displayed on the user interface. A sound signal may be generated to indicate the end of the weighing step. The following operation may be to select the infant profile in step 225 via a displayed message 73 on the screen and to record the remaining milk quantity in relation to the selected infant profile in step 230.

The synchronization of the consumption information with the computer may be carried out immediately after in step 240 or be postponed if the communication is not established. In the next step 250, a visual and/or sound signal can be generated by the scale.

FIGS. 11 to 18 represent screenshots of the user interface of the application or program executed on the computer, in particular, of a smart phone, and show the different possible functions of the application for providing a personalized infant nutrition coaching. It should be noticed that other computer interface configurations can be envisaged where the selection is not made on a touch screen but with other means such as by activation of keyboard commands or by the use of a dedicated computer input device (e.g. a computer mouse or stylet).

FIG. 11 relates to the control interface 30 depicting an application icon 31 (e.g. named "SmartScale") when installed on the smartphone. By opening (e.g. clicking or tapping on) such application, the user can access different menus and submenus related to the nutritional coaching program.

As illustrated in FIG. 12 showing a second control interface 32, the computer program may be configured to automatically connect to the available electronic scale and/or may invite the user to select a scale which is placed within the connecting distance of the computer. The available scales can be detected automatically and listed on a list of identified scales (e.g. by their name: e.g. SmartScale3") which form command(s) 33 that can be individually selected and activated by the user, e.g. by simple click or touch. The connectivity to the scale may also be bypassed by selecting a bypass command (e.g. "Ignore") to enable access for the user to application's functions which do not necessarily require the connection to the scale (e.g. inputting or consulting information, shopping, etc.).

A next control interface 35 may depict a menu for access to infant profiles (e.g. named "Babies profiles"). The menu may present a list of infant profile summaries 52. The summaries may contain limited information such as main identification data (e.g. photo, name, etc.) as well as essential coaching information 36 for coaching the preparation of the next infant formula via the electronic scale. For instance, the coaching information may include the infant formula powder weight and/or number of spoons and/or the volume (or amount) of water required for preparation (e.g. in milliliter). The coaching information may be completed by intuitive pictograms 53 that can easily inform the user on the type of instruction. An addition function 37 may be provided for each infant profile to add an infant feeding manually to the feeding history. In a submenu 38, data entry means 39 are provided related to personal infant profile information. The data entry means enable the information to be consulted, edited and modified by the user. The information may comprise, for example, the age, gender, size, weight of the infant. At least part of this information, for example, the age and/or weight, will enables the program to properly pair an infant formula product to the selected infant profile. The additional information may comprise the identification of infant formula product 40 which is recommended for the preparation of the infant as function of the personal infant profile information 39. Coaching information 41 may be provided such as the number of feedings per day ("Bibs per day") and/or water volume ("Bibs volume"). The coaching information 41 may optionally be modified, for example, by the way of change functions which can incrementally modify the value of the information e.g. by touch (− or +). The manually modifiable coaching information such as the water volume can be taken for the water set point of the electronic scale in the coaching instruction set.

Figure 15:
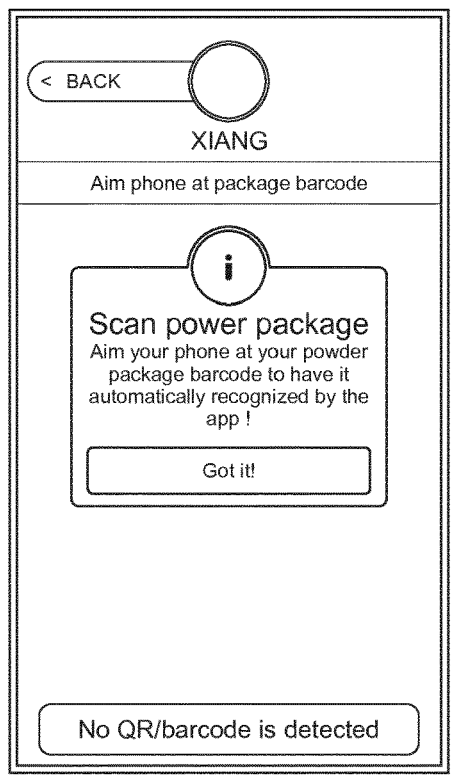
Figure 16:
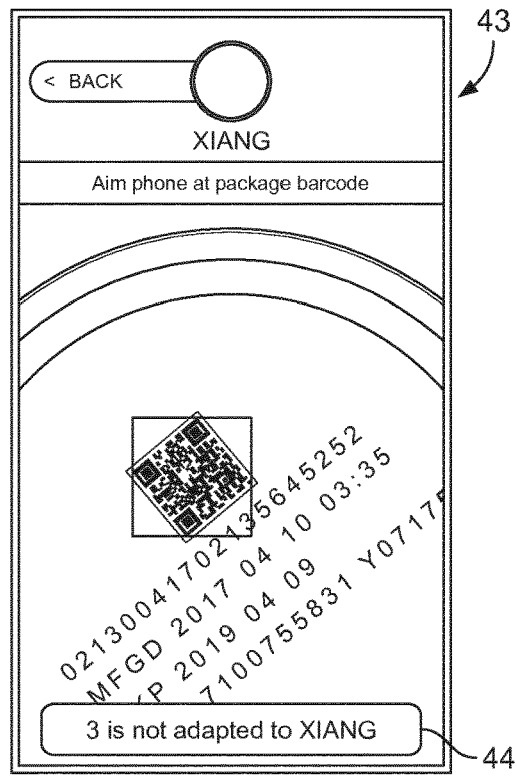
Figure 17:
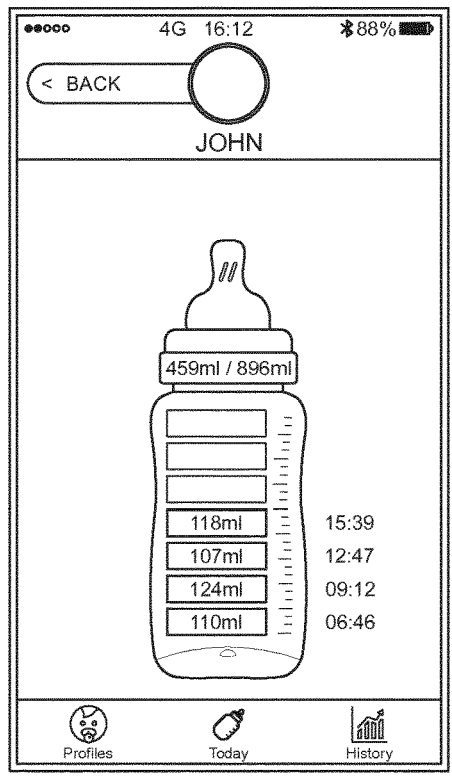
Figure 18:
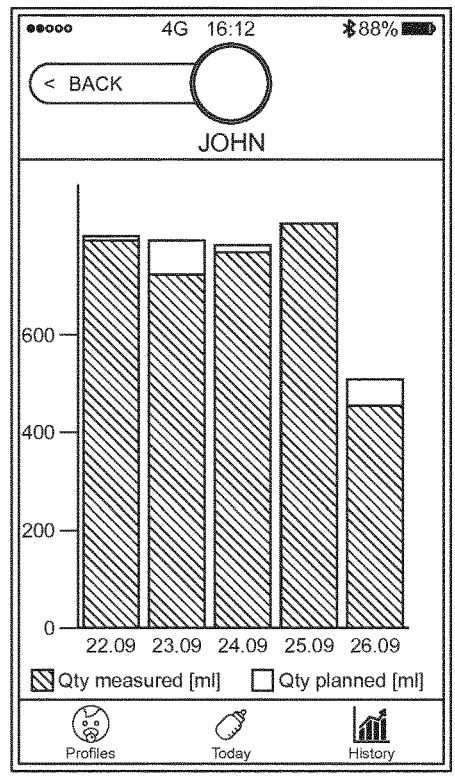

A control interface 42 of FIG. 15 can serve as guidance for retrieving the infant formula product data information. The interface may provide specific instructions for retrieving information such as by scanning the code of the infant formula product. The application is preferably configured for automatically capturing the information data from the code (e.g. QR code). The program may be further configured for assessing the proper adaptation of the retrieved product information with the infant profile information, e.g. age and/or weight of the infant such as in control interface 43. The program may run a safety check operation to ensure that the infant formula product is a product authorized or adapted for infant consumption (e.g., recall product, expiry date passed, etc.). A message 43 may be provided as to the proper adaptation and/or pairing of the infant formula product to the selected infant profile. The message may also mention that the product is not an authorized or adapted product. It should be noted that other ways may exist to retrieve information product in particular from the server via the communication network. However, the retrieval of the product information from the product itself such as by scanning is preferred because it can give reassurance to the user that the available infant formula product is one adapted to the infant to be fed.

Other control interfaces can display information as to the feeding history for a particular infant profile and/or for a particular time period. For instance, control interface 45 of FIG. 17 displays a daily consumption monitoring showing the infant formula consumption on a feeding volume and time basis. The total volume can be summed and compared to the daily planned consumption. As another example, a control interface 46 can display the consumption history over time which may include feeding statistical data showing for a given period (e.g. over 5 days) the difference between the planned infant formula quantities and the consumed quantities per each day (i.e. which are directly related to the remaining quantities of liquid measured by the scale after feeding as previously described in relation to the consumption control procedure of FIG. 4). The planned infant formula quantities are preferably the theoretical recommended quantities calculated or extrapolated by the computer program as function of the paired infant profile and product information. Alternatively, the planned quantities can be the infant formula weighed during preparation by the scale.

The user interface of the scale of the invention is very intuitive and enables the user to prepare the infant formula in the most accurate and safe manner. In view of FIG. 20 showing the work flow of scale's user interface, the coaching programs are generally designed by starting each operation by intuitively named requests 61, 64, 67, 68, 69. Generally, certain requests require preparation-related steps such as placing the infant container on the scale or filling container with water or ingredient. Certain requests must be followed by a validation on a selection button to initiate the next step, e.g. to initiate a weighing operation by click or to validate the selection of an infant profile by click 63. A weighing operation is generally displayed in real time by showing the weight increase such as by means of a progression bar (or a percentage or function) 51. Certain operations are ended by a visual and/or sound signal 66.

The nutritional coaching application may include additional functions such as online shopping or tracking of food input other than infant formula (such as fruit, meat, etc.).

The invention claimed is:

1. A computer program executable on a computer for assisting preparation of an infant formula in an infant feeding container using an electronic scale, the electronic scale arranged in communication with the computer, wherein the computer program is configured to:
store at least one personal infant profile comprising information related to an identified infant,
pair an infant formula product selected from a plurality of infant formula products with the at least one personal infant profile, and
compute from the pairing of the infant formula product and the at least one personal infant profile, a coaching instruction set comprising preparation information and instruction data, the instruction data selected from the group consisting of a time related to a frequency or period of preparation of the infant formula, a number of preparations per day, infant formula product information, and combinations thereof,
determine in the coaching instruction set a water quantity set point and an infant formula quantity set point for enabling the scale to control the weighing the water quantity set point and the infant formula quantity set point,
the coaching instruction set enabling control of operations of the electronic scale for preparation of an individual infant formula,
the coaching instruction set configured to be communicated to or be generated by the electronic scale for enabling the electronic scale for the control of the operations,
wherein conditions and/or a time at which the preparation has been completed is confirmed by the electronic scale to the computer and recorded in the computer and/or the electronic scale to define a historical feed tracking of the preparation,
wherein the computer program comprises a consumption monitoring program carried out under the control of the electronic scale, wherein the consumption monitoring program is configured to:
determine a remaining infant formula product amount to be consumed,
record the remaining infant formula product amount, and
transfer the remaining infant formula product amount to the computer,
wherein the preparation information comprises the historical feed tracking of the infant formula.

2. The computer program according to claim 1, wherein the computer program is further configured to provide a data entry means accessible to a user for acquiring information on the at least one personal infant profile.

3. The computer program according to claim 1, wherein the computer program is further configured to provide at least one control interface adapted for retrieving product identification data associated to the infant formula product for identification or authentication of the infant formula product to enable the pairing with the at least one personal infant profile.

4. The computer program according to claim 1, wherein the computer program is configured to compute and display on a user interface of the computer individual and/or cumulated weighed quantities of the infant formula product per time period.

5. The computer program according to claim 4, wherein the computer program is further configured to display on a user interface of the computer remaining infant formula product amounts per a time period.

6. The computer program according to claim 1, wherein the computer program is configured to communicate wirelessly to the electronic scale.

7. The computer program according to claim 1, wherein the computer program is configured to be hosted by an in-home computer, a tablet or a smart phone.

8. An electronic scale for assisting preparation of an infant formula in an infant feeding container, the electronic scale comprising:
a weighing unit with a user interface,
a control unit, and
a communication module arranged to communicate with a computer hosting a computer program, the computer program executable on the computer for assisting the preparation of the infant formula in the infant feeding container using the electronic scale, the electronic scale arranged in communication with the computer,
wherein the computer program is configured to:

store at least one personal infant profile comprising information related to an identified infant, pair an infant formula product selected from a plurality of infant formula products with the at least one personal infant profile, and compute from the pairing of the infant formula product and the at least one personal infant profile, a coaching instruction set comprising preparation information and instruction data, the instruction data selected from the group consisting of a time related to a frequency or period of preparation of the infant formula, a number of preparations per day, infant formula product information, and combinations thereof, the coaching instruction set enabling control of operations of the electronic scale for the preparation of an individual infant formula, the coaching instruction set configured to be communicated to or be generated by the scale for enabling the scale for the control of the operations, wherein the electronic scale comprises a coaching program configured for selecting an infant profile and controlling the operations of the infant formula preparation according to the coaching instruction set received from the computer, the coaching instruction set resulting from the pairing of at least one personal infant profile and the infant formula product selected from a plurality of infant formula products, wherein conditions and/or a time at which the preparation has been completed is confirmed by the electronic scale to the computer and recorded in the computer and/or the electronic scale to define a historical feed tracking of the preparation, wherein the computer program comprises a consumption monitoring program carried out under the control of the electronic scale, wherein the consumption monitoring program is configured to:

determine a remaining infant formula product amount to be consumed, record the remaining infant formula product amount, and transfer the remaining infant formula product amount to the computer, wherein the preparation information comprises the historical feed tracking of the infant formula, wherein the electronic scale is further arranged for weighing and controlling a water quantity and an infant formula quantity to match respectively a water set point and an infant formula set point during preparation.

9. The electronic scale according to claim 8, wherein the electronic scale is arranged for displaying on the user interface information related to the ongoing preparation and/or next preparation(s).

10. The electronic scale according to claim 8, wherein the electronic scale is arranged for displaying on the user interface the water quantity and the infant formula quantity in real time.

11. The electronic scale according to claim 8, wherein the electronic scale comprises a temperature sensing unit for sensing the liquid temperature in the container; the temperature sensing unit being connected to the weighing unit for communicating a temperature of the water and/or infant formula.

12. A system for assisting preparation of an infant formula in an infant feeding container, the system comprising:

a computer program executable on a computer for assisting the preparation of the infant formula in the infant feeding container using the electronic scale, the electronic scale arranged in communication with the computer, wherein the computer program is configured to:

store at least one personal infant profile comprising information related to an identified infant, pair an infant formula product selected from a plurality of infant formula products with at least one personal infant profile, and compute from the pairing of the infant formula product and at least one personal infant profile, a coaching instruction set comprising preparation information and instruction data, the instruction data selected from the group consisting of a time related to a frequency or period of preparation of the infant formula, a number of preparations per day, infant formula product information, and combinations thereof, the coaching instruction set enabling control of operations of the electronic scale for the preparation of an individual infant formula, the coaching instruction set configured to be communicated to or be generated by the electronic scale for enabling the electronic scale for the control of the operations, the electronic scale being arranged to communicate with the computer, and the electronic scale being arranged for controlling operations of the infant formula preparation according to the received coaching instruction set communicated by the computer, wherein the electronic scale is further arranged for weighing and controlling a water quantity and an infant formula quantity to match respectively a water set point and an infant formula set point during preparation, wherein conditions and/or a time at which the preparation has been completed is confirmed by the electronic scale to the computer and recorded in the computer and/or the electronic scale to define a historical feed tracking of the preparation, wherein the computer program comprises a consumption monitoring program carried out under the control of the electronic scale, wherein the consumption monitoring program is configured to:

determine a remaining infant formula product amount to be consumed, record the remaining infant formula product amount, and transfer the remaining infant formula product amount to the computer, wherein the preparation information comprises the historical feed tracking of the infant formula.

13. The computer program according to claim 3, wherein the retrieving product identification data comprises scanning a code on the infant formula product.

14. The computer program according to claim 6, wherein the computer program is configured to communicate bi-directionally to the electronic scale.

15. The electronic scale according to claim 10, wherein the water quantity and the infant formula quantity are displayed in real time as progression bars.

16. The electronic scale according to claim 11, wherein the electronic scale unit is configured to interrupt the coaching set instructions if the temperature of the water and/or infant formula deviates from a temperature set point.

17. The computer program according to claim 1, wherein the instruction data comprises the number of preparations per day.

18. The computer program according to claim 1, wherein the instruction data comprises the time related to the period of preparation, wherein the computer program is further configured to verify if the preparation of the infant formula is within the period of preparation and communicate with the electronic scale if the preparation of the infant formula is not within the period of preparation.

19. The computer program according to claim 3, wherein the computer program is further configured to:
   authorize the product identification data associated to the infant formula product, and
   end the control of operations if the product identification data is not adapted to the infant profile.

20. The computer program according to claim 1, wherein the computer program is configured to pair the infant formula product with the infant profile based on an age and a weight of the identified infant stored in the infant profile.

\* \* \* \* \*